Aug. 28, 1928.
A. O. AUSTIN
1,682,105
INSULATOR FITTING
Filed March 1, 1923
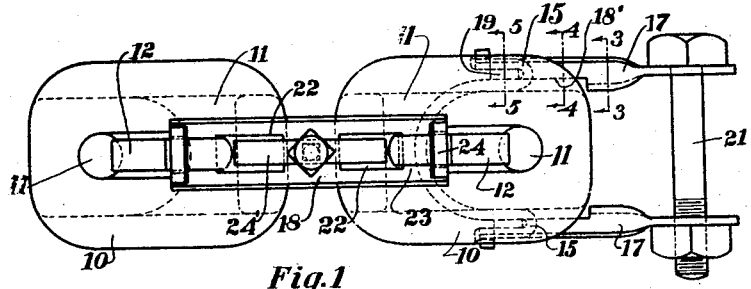
Fig. 1
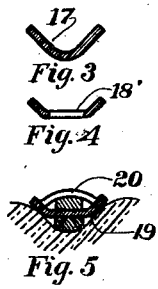
Fig. 3
Fig. 4
Fig. 5
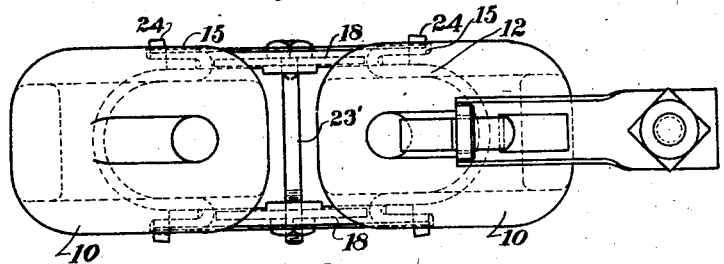
Fig. 2
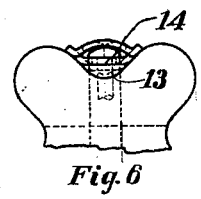
Fig. 6
Fig. 10
Fig. 11
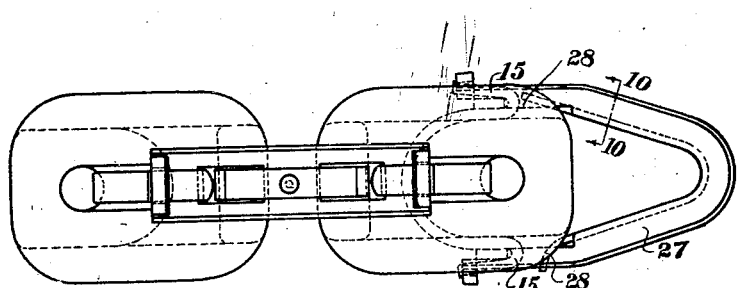
Fig. 7
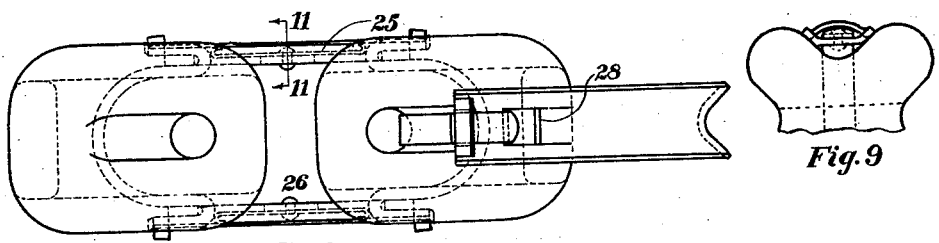
Fig. 8
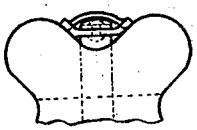
Fig. 9
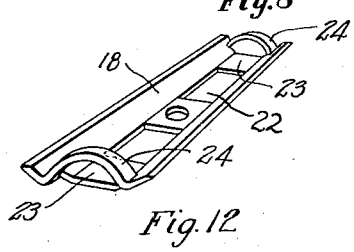
Fig. 12
INVENTOR
Arthur O. Austin
BY Nissen & Crane
ATTORNEY Patented Aug. 28, 1928.

1,682,105

UNITED STATES PATENT OFFICE.

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY.

INSULATOR FITTING.

Application filed March 1, 1923. Serial No. 621,975.

This invention relates to fittings or holding devices for use in connection with insulators such as are shown in my prior design Patent #56,262, Sept. 14, 1920.

This invention has for its object the provision of fittings which shall be simple and economical to manufacture and which shall be of improved construction, easy to install and strong and efficient in operation.

This invention is exemplified in the combination and arrangement of parts shown in the accompanying drawing and described in the following specification and it is more particularly pointed out in the appended claims.

In the drawing:

Fig. 1 is an elevation of a pair of insulators having connectors embodying one form of the present invention applied thereto.

Fig. 2 is a top plan view of the parts shown in Fig. 1.

Fig. 3 is a transverse section on line 3—3 of Fig. 1.

Fig. 4 is a section on line 4—4 of Fig. 1.

Fig. 5 is a section on line 5—5 of Fig. 1.

Fig. 6 is a fragmentary end view looking from the left in Fig. 2.

Fig. 7 is an elevation of a slightly modified form of the invention.

Fig. 8 is a top plan view of the parts shown in Fig. 7.

Fig. 9 is a fragmentary end elevation of the parts shown in Fig. 7.

Fig. 10 is a section on line 10—10 of Fig. 7.

Fig. 11 is a section on line 11—11 of Fig. 8.

Fig. 12 is a perspective view of a detail.

As illustrated in the drawings the numeral 10 designates a pair of insulators connected in series. Any number of such insulators may of course be included in the string. The insulators are provided with crossed transverse openings 11 through which yoke members 12 are threaded. These yoke members may be rounded on their faces which engage the insulators as shown at 13 Fig. 6, and flattened on their outer faces as shown at 14. This gives a fitting surface where the yokes bear upon the insulator and permits a close bend at the ends of the yokes to form hooks 15. The hooks are secured to supporting bars 17 or to connecting links 18 for connecting the parts of the insulator string to one another or to a supporting member. The supporting bars 17 are curved in section as shown in Fig. 3, and have slots 18′ cut therein to facilitate engagement with the hooks 15. At the ends of the slots 18′, the connector bars are slitted crosswise to provide holding bars 19 engaged by the hooks 15. Adjacent the holding bars 19 are retainer bars 20, the two bars being spread in opposite directions to permit the end of the hook 15 to pass between them. In this way the retainer bar 20 exerts a snubbing operation on the hook 15 to prevent unbending of the hook under load. The supporting bars 17 may be connected by a bolt 21 or other suitable device, to any convenient form of support.

The connector bars 18 for securing insulators to one another are provided with slots 22 similar to the slots 18′ and are transversely slitted at their ends to form holding bars 23 and retainer bars 24 similar to those described in connection with the connector 17. The retainer bars 24 may be slightly canted to facilitate entry of hooks 15. The connectors 18 at opposite sides of the insulators, are joined by a transverse bolt 23′. Retainer plates 24′ are held against the connector plates 18 by the bolt 23′ in position to close the slots 22 and prevent disconnection of the hooks 15. It will be apparent that the various portions of the fitting may be formed by automatic machinery almost entirely such as punch presses or similar machines, thus providing very economical methods of manufacturing. The parts are easily installed since the connections are made by simply hooking the parts and inserting the bolt 23′. The strength and reliability of the connection is greatly increased by the retainer bars 24 which prevent unbending of the hooks 15.

In the form of the invention shown in Figs. 7, 8, and 9, the bolt 23′ is omitted and spring plates 25 held by rivets are substituted for the retainer plates 24′. In place of the supporting links 17 and bolt 21, a sheet metal clevis 27 is used, the clevis being provided with tongues 28 which retain the hooks 15 in position. The tongues 28 are bent outwardly as shown in the lower portion of Fig. 7 to permit assembly of the parts, but when the parts are together the tongue is bent inwardly as shown in the upper portion of Fig. 7 which prevents disconnection of the hook 15. The manner of assembling the parts shown in Figs. 7 and 8 is similar to that described in Figs. 1 and 2.

I claim:

1. Connectors for insulators comprising a pair of yokes arranged to extend through openings in a pair of insulators to be connected, the ends of said yokes being bent to form hooks and plates overlapping said insulators and having openings therein for engaging said hooks to join said insulators to each other.

2. A connector for an insulator having a groove therein, said connector comprising a yoke positioned in said groove and having an outwardly bent hook on the end thereof and a link having transverse slits therein providing transverse bars, said bars being bent in opposite directions to provide an engagement for said hook, one of said bars lying within the bight of said hook and the other engaging the outer face of the free end of said hook.

3. A connector for an insulator having a perforation therethrough, said connector comprising a yoke threaded through said perforation and having the end thereof bent outwardly and backwardly to form a hook, a link having transverse slits therein forming adjacent transverse bars, said bars being bent in opposite directions to provide an opening for the free end of said hook and means for retaining said hook in engagement with said bars.

4. Connecting means for a pair of insulators comprising yoke members threaded through perforations in each of said insulators, said yoke members having the opposite ends thereof bent to form hooks, sheet metal connector links having openings therein forming eyes into which said hooks are linked, said connector links bridging the space between said insulators at opposite sides of said insulators and a transverse connector for holding said links against the sides of said insulators.

5. Connecting means for a pair of insulators comprising a yoke member connected with each of said insulators and having its ends bent backwardly to form hooks, a pair of channel shaped links connecting said hooks and having transverse slits therein to provide a pair of adjacently disposed bars for engaging each of said hooks, said bars being spaced relative to each other so that they pass on opposite sides of the free end of the hook when the parts are assembled.

6. Connecting means for a pair of insulators having perforations therethrough, said connecting means comprising a yoke member threaded through each of said perforations, said yoke members having inner curved faces for engaging the insulators and having substantially flat outward faces, the ends of said yoke member being bent outwardly and backwardly to form hooks, channel shaped links for engaging said hooks to connect said insulators to each other and retainer bars extending from side to side of said channel shaped links to hold said hooks from straightening.

7. A connector for an insulator having a pair of relatively angularly disposed perforations therethrough and having grooves in the sides thereof communicating with said perforations, said connector comprising interlinked yokes threaded through said perforations and having the ends thereof bent outwardly and backwardly to form hooks, connector links positioned in said grooves and engaging said hooks, said connector links having bars for engaging the inner and outer sides of the free ends of said hooks to prevent unbending of said hooks.

8. In combination a pair of insulators each having perforations extending therethrough in angular relation to each other, interlinked yoke members threaded through said perforations and having outwardly and backwardly bent hooks thereon, connector links engaging adjacent hooks of said yoke members and bridging the space between said insulators, said links comprising channel shaped sheet metal plates having perforations therethrough and slits therein to provide locks for said hooks to prevent unbending of said hooks, and holding bars engaging the oppositely directed hooks of one of said members, said holding bars having means for engaging said oppositely directed hooks to prevent disengagement of said hooks.

In testimony whereof I have signed my name to this specification on this 24th day of February, A. D. 1923.

ARTHUR O. AUSTIN.